US012782883B2

United States Patent

Gao et al.

(12) United States Patent
(10) Patent No.: US 12,782,883 B2
(45) Date of Patent: Nov. 3, 2026

(54) LIGHT EMISSION CONTROL DEVICE, ELECTRONIC TIMEPIECE, LIGHT EMISSION CONTROL METHOD AND STORAGE MEDIUM

(71) Applicant: CASIO COMPUTER CO., LTD., Tokyo (JP)

(72) Inventors: Hua Gao, Hamura (JP); Yuki Iwasaki, Tachikawa (JP); Atsushi Kato, Akishima (JP); Shogo Hyakkan, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 458 days.

(21) Appl. No.: 18/340,538

(22) Filed: Jun. 23, 2023

(65) Prior Publication Data

US 2023/0418239 A1 Dec. 28, 2023

(30) Foreign Application Priority Data

Jun. 23, 2022 (JP) ................................ 2022-101088

(51) Int. Cl.
*G04G 9/10* (2006.01)

(52) U.S. Cl.
CPC ..................................... *G04G 9/10* (2013.01)

(58) Field of Classification Search
None
See application file for complete search history.

(56) References Cited

U.S. PATENT DOCUMENTS

| | | | | |
|---|---|---|---|---|
| 3,672,155 | A | 6/1972 | Bergey et al. | |
| 4,207,734 | A | 6/1980 | Moyer | |
| 2012/0057437 | A1* | 3/2012 | Kato | G04C 10/02 323/299 |
| 2015/0378319 | A1 | 12/2015 | Yamakawa | |
| 2016/0086554 | A1* | 3/2016 | Suzuki | G09G 3/3406 345/102 |

FOREIGN PATENT DOCUMENTS

| | | | |
|---|---|---|---|
| CN | 201854471 | U | 6/2011 |
| CN | 114097307 | A | 2/2022 |
| JP | H06118184 | A | 4/1994 |
| JP | H10332842 | A | 12/1998 |
| JP | H1173831 | A | 3/1999 |
| JP | H11251084 | A | 9/1999 |
| JP | 2002350569 | A | 12/2002 |
| JP | 2003057366 | A | 2/2003 |
| JP | 2013156017 | A | 8/2013 |
| JP | 2013156158 | A | 8/2013 |

OTHER PUBLICATIONS

Notice of Reasons for Refusal dated Aug. 20, 2024 received in Japanese Patent Applicaiton No. 2022-101088.

(Continued)

*Primary Examiner* — Aneeta Yodichkas

(74) *Attorney, Agent, or Firm* — Scully, Scott, Murphy & Presser, P.C.

(57) ABSTRACT

A light emission control device includes at least one processor. The processor performs dimming control on a light emitting device by interrupt processing.

16 Claims, 4 Drawing Sheets

(56) References Cited

OTHER PUBLICATIONS

Decision of Refusal dated Jan. 7, 2025 received in Japanese Patent Application No. 2022-101088.
Notice of Reasons for Refusal dated Apr. 23, 2024 received in Japanese Patent Application No. JP 2022-101088.
Extended European Search Report dated Nov. 24, 2023 received in European patent Application No. EP 23180144.0.
Office Action dated Oct. 30, 2025 received in European Patent Application No. 23180144.0.
Japanese Notice of Reasons for Refusal dated Apr. 28, 2026 received in Japanese Patent Application No. 2025-062339.

* cited by examiner

LIGHT EMISSION CONTROL DEVICE, ELECTRONIC TIMEPIECE, LIGHT EMISSION CONTROL METHOD AND STORAGE MEDIUM

REFERENCE TO RELATED APPLICATIONS

This application is based upon and claims the benefit of priority from the prior Japanese Patent Application No. 2022-101088, filed on Jun. 23, 2022, the entire contents of which are incorporated herein by reference.

TECHNICAL FIELD

The present disclosure relates to a light emission control device, an electronic timepiece, a light emission control method and a storage medium.

DESCRIPTION OF RELATED ART

There has been used a technique of controlling luminous intensity using pulse width modulation (PWM) in a case where a light emitter, such as a light having a light emitting diode(s) (LED), is put on in an electronic device. The luminous intensity can be easily changed by changing the duty cycle of PWM.

In JP 2013-156017 A, there is disclosed a technique of, in an electronic timepiece, on which a strict requirement of reduction in power consumption has been imposed, detecting a press on a predetermined pushbutton switch and putting on a light emitter for a predetermined time to illuminate a display.

SUMMARY OF THE INVENTION

According to an aspect of the present disclosure, there is provided a light emission control device including at least one processor that performs dimming control on a light emitting device by interrupt processing.

BRIEF DESCRIPTION OF DRAWINGS

The accompanying drawings are not intended as a definition of the limits of the present disclosure but illustrate embodiments of the present disclosure, and together with the general description given above and the detailed description of embodiments given below, serve to explain the principles of the present disclosure, wherein.

DETAILED DESCRIPTION

Hereinafter, one or more embodiments of the present disclosure will be described with reference to the drawings.

Figure 1:
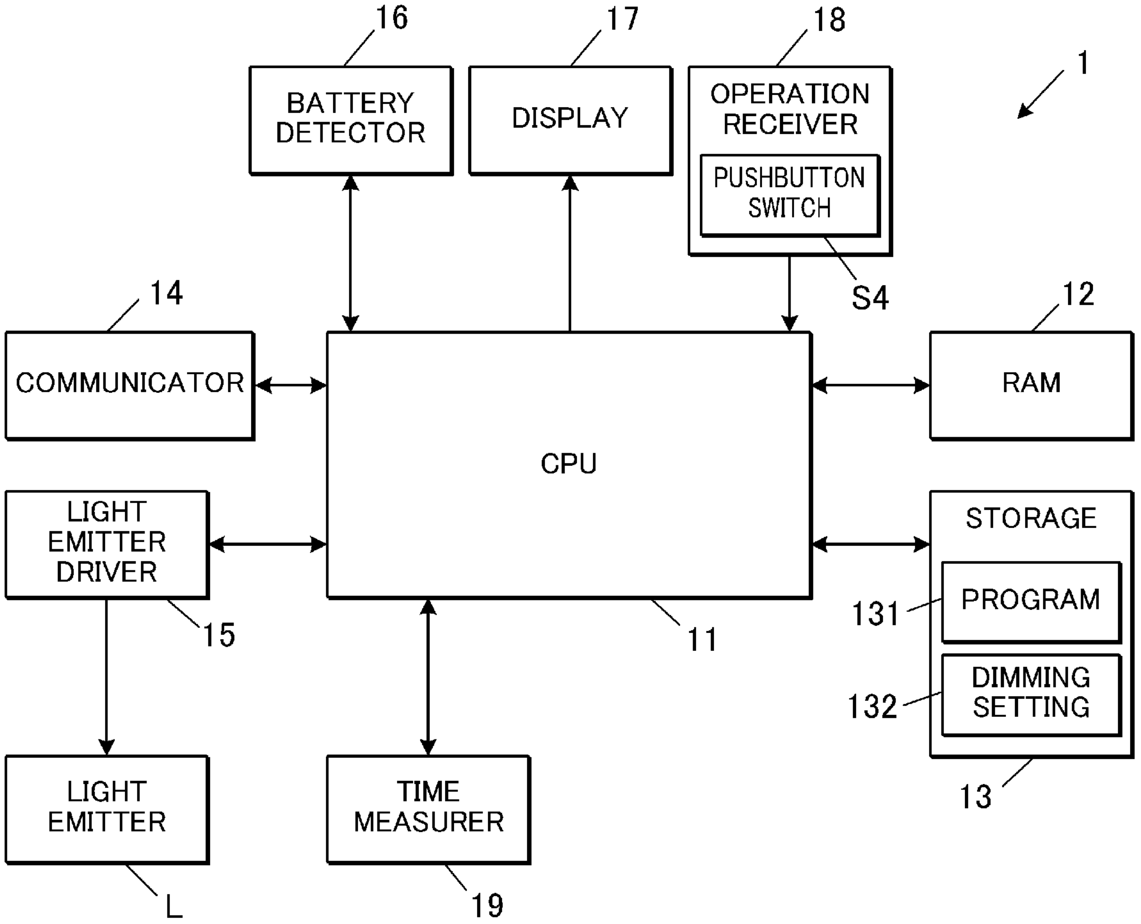
FIG. 1 is a block diagram showing a functional configuration of an electronic timepiece of an embodiment(s)

FIG. 1 is a block diagram showing a functional configuration of an electronic timepiece 1 of an embodiment(s).

The electronic timepiece 1 includes a central processing unit (CPU) 11 (controller), a random access memory (RAM) 12, a storage 13, a communicator 14, a light emitter driver 15, a light emitter L, a battery detector 16, a display 17, an operation receiver 18, and a time measurer 19.

The CPU 11 is a processor that performs arithmetic processing and overall control of operation (actions) of the electronic timepiece 1. The CPU 11 may be a single processor or a plurality of processors that perform arithmetic processing in parallel or independently depending on a program/process or the like. The CPU 11 may include a microcontroller that performs a dedicated action(s). The CPU 11 is included in a light emission control device or a computer of this embodiment.

The RAM 12 provides a working memory space for the CPU 11 and stores temporary data.

The storage 13 is a nonvolatile memory, for example, a flash memory. The storage 13 stores programs including a program 131 and setting data. The stored setting data includes a dimming setting 132.

The communicator 14 controls communications with external devices. The communications may be performed in accordance with Bluetooth®, for example.

The light emitter driver 15 operates/drives the light emitter L to emit light. The light emitter driver 15 causes the light emitter L to emit light by pulse width modulation (PWM) at a set duty cycle, thereby adjusting luminous intensity (dimming). The luminous intensity herein indicates the average of luminous intensities over a period sufficiently longer than a PWM period. The light emitter driver 15 may have a well-known PWM circuit configuration. For example, the light emitter driver 15 may generate triangular waves or sawtooth waves, and applies, to the light emitter L, a voltage obtained by binarizing (and amplifying as needed) the waves in accordance with a reference voltage determined for a setting of the duty cycle (i.e., a set duty cycle). Thus, the light emitter driver 15 may be capable of finely switching light emission of the light emitter L between ON and OFF and making a light emission period of the light emitter L correspond to the duty cycle. The light emitter driver 15 cuts (OFF) power supply to the abovementioned PWM circuit at the time of putting out the light emitter L, and keeps the light emitter L off. If the light emitter driver 15 has a microcontroller and therefore can perform control, the light emitter driver 15 is included in the controller of this embodiment.

The light emitter L has, for example, a light emitting diode(s) (LED(s)). The light emitter L emits light by current that flows in response to the voltage applied by the light emitter driver 15, thereby illuminating a display surface constituted by the display 17. Color of the emitted light may be any color, but in this embodiment, substantially white (e.g., color of an electric light).

The battery detector 16 measures/detects an input voltage of power that is supplied from a not-shown battery to the CPU 11 or the like via a not-shown power supply unit, and outputs the measured data. The battery detector 16 is used for detection of a heavy load described below in addition to detection of the remaining battery life.

The display 17 displays at least the current time under the control of the CPU 11. The display 17 may have a digital display screen, such as a liquid crystal display. Alternatively or additionally, the display 17 may be configured to indicate time with a plurality of hands, namely, may have components such as hands, a gear train that rotates the hands, and a stepping motor that drives the gear train to rotate. In response to an interrupt signal generated at every exact second of time, the CPU 11 controls and causes the display 17 to update and set its display content. The display 17 may be capable of displaying, in addition to the current time, a day of the week, a date, an alarm notification/setting and other types of information.

The operation receiver 18 receives an input operation(s) from the outside, and outputs a reception signal corresponding to the content of the received operation to the CPU 11, so that the CPU 11 obtains the reception signal. The operation receiver 18 has, for example, a pushbutton switch that is an input interface, and may further have other components that receive operations, such as a crown. The number of pushbutton switches is not limited to, but may be one to four, for example. In this embodiment, the operation receiver 18 has a plurality of pushbutton switches including a pushbutton switch S4. A press on this pushbutton switch S4 causes the light emitter L to emit light. Although not particularly limited, the CPU 11 detects and obtains the reception signal from the operation receiver 18 by interrupt processing of a certain frequency (e.g., 16 Hz).

The time measurer 19 measures the current date and time on the basis of a clock signal input from a not-shown oscillator circuit, and outputs the current date and time to the CPU 11. The time measurer 19 may have a real-time clock (RTC), and further, may be configured such that a CPU (e.g., CPU 11) measures the current date and time. The interrupt signal that triggers interrupt processing, such as the above-mentioned updating-and-setting of the display content, is obtained by dividing a clock signal of a certain frequency (e.g., about 32 kHz) by an appropriate divisor.

The electronic timepiece 1 may further have a satellite radio wave receiver/processor, a notifier and various physical sensors. The satellite radio wave receiver/processor receives radio waves from positioning satellites and performs arithmetic processing for positioning and so forth. The notifier outputs buzzers or beeps and/or generates vibrations, for example. Examples of the physical sensors include an acceleration sensor and a geomagnetic field sensor.

Next, an illumination action in the electronic timepiece 1 will be described.

In the electronic timepiece 1, as described above, a press (predetermined input operation) on the pushbutton switch S4 of the operation receiver 18 causes the light emitter driver 15 to operate and put on the light emitter L (i.e., to operate and cause the light emitter L to emit light). A light emission time (lighting time) of the light emitter L is set in advance. The set time is 1.5 seconds, for example. In the electronic timepiece 1, the light emitter L is subjected to dimming control. That is, when the light emitter L is put on, the luminous intensity increases from zero to the maximum over a certain time, and when the light emitter L is put out, the luminous intensity decreases from the maximum to zero over a certain time.

The luminous intensity is adjusted by changing the duty cycle of PWM as described above. In order that a user can visually recognize (i.e., see) change in the luminous intensity (luminance) as natural change, it is required that the change is about 32 or higher Hz change. Setting data of a duty-cycle change pattern(s) is stored/retained in the storage 13 in advance. On the basis of the setting data, the CPU 11 writes and updates a set value of the duty cycle in a register of the light emitter driver 15 (i.e., performs dimming control) every 1⁄32 seconds, thereby changing the duty cycle and accordingly changing the luminous intensity of the light emitter L. In the electronic timepiece 1, this writing-and-updating of the set value at 32 Hz is performed by interrupt processing.

Data of the set value corresponding to the duty cycle that is updated each time the interrupt processing is performed may be included in the dimming setting 132. The CPU 11 may change the set value from one to another, referring to the dimming setting 132. Alternatively, the set value may be a simple count value, and the light emitter driver 15 may retain the dimming setting 132 and set a voltage value corresponding to the count value on the basis of the dimming setting 132.

Figure 2:
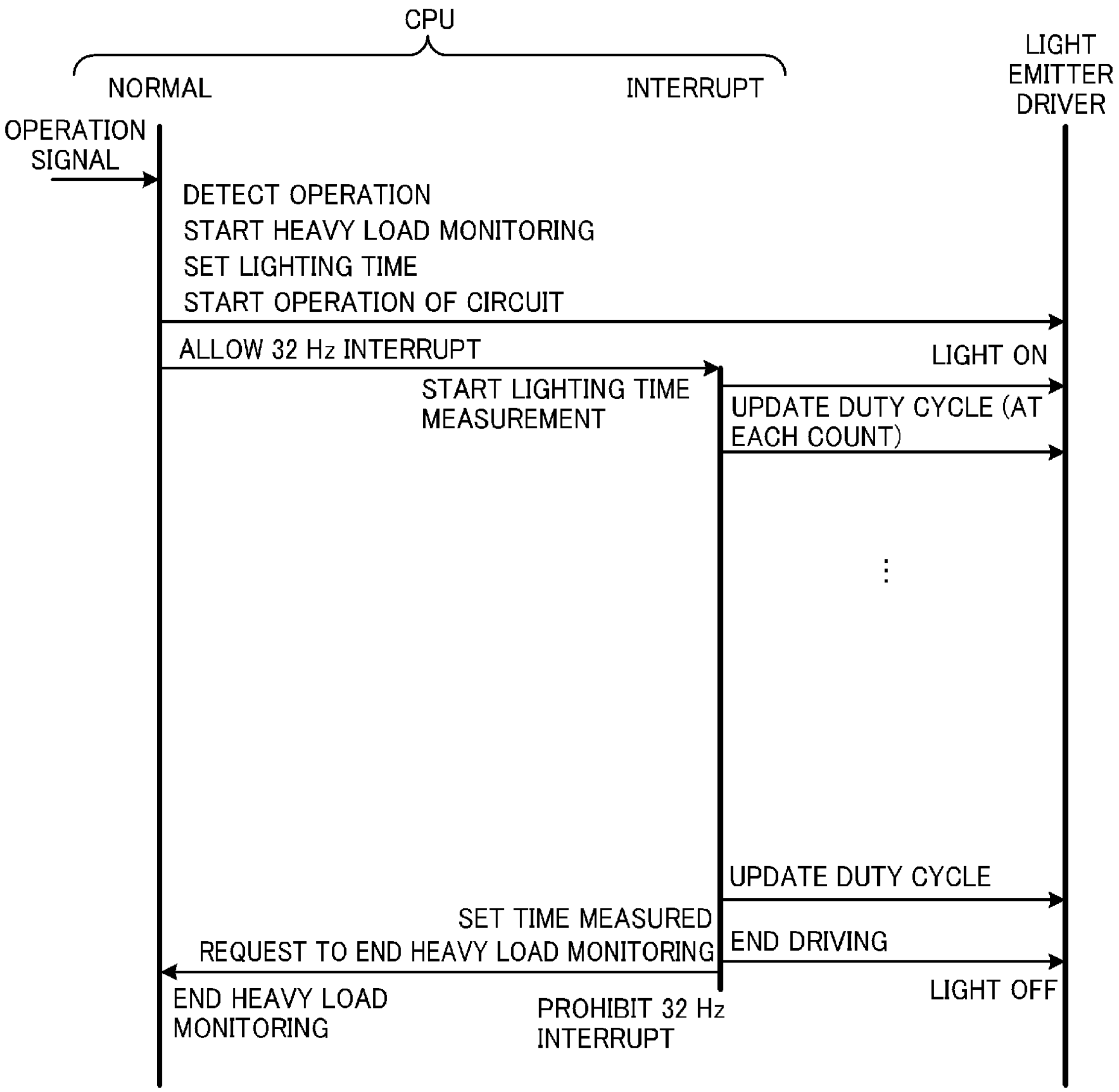
FIG. 2 is a sequence diagram showing a flow of dimming control.

FIG. 2 is a sequence diagram showing a flow of the dimming control.

When a reception signal corresponding to a user's press on the pushbutton switch S4 is input to the CPU 11, the CPU 11 detects this operation on the pushbutton switch S4 in looping normal processing (normal action control other than interrupt processing). In the normal processing, the CPU 11 causes heavy load monitoring to be started, sets the lighting time (1.5 sec.), and causes a circuit from the light emitter driver 15 to the light emitter L to start to operate. Then, the CPU 11 allows interrupt processing for 32 Hz light emission control, and then performs the light emission control (dimming control) by interrupt processing.

In a case where the lighting time is 1.5 seconds, the interrupt processing is performed 48 times in response to a 32 Hz interrupt signal. The lighting time may be expressed by counting the number of times that the interrupt processing is performed. That is, counting 48 times may be expressed by one byte (the set value of the lighting time is 0x2f).

The heavy load monitoring is an action of monitoring decrease in the input voltage (a monitoring function of a heavy load state), which is caused by performing high-load processes in an overlapped manner and accordingly exceeding the power supply capability of the battery (i.e., putting the CPU 11 in the heavy load state). In this heavy load monitoring, the battery detector 16 detects the voltage input to the CPU 11. More specifically, the battery detector 16 may compare the input voltage with a threshold voltage to detect an abnormal voltage drop. The heavy load monitoring is performed with a higher frequency than the normal detection of the remaining battery life. The threshold voltage for the heavy load monitoring may be different from that for the detection of the remaining battery life. Whether or not to perform the heavy load monitoring may be set/determined with a simple 1-bit flag or the like. At the timing at which a detection result can be obtained from the battery detector 16, if a flag indicating execution of the heavy load monitoring is set, the CPU 11 obtains the detection result from the battery detector 16 as the monitored data.

The CPU 11 starts 32 Hz interrupt processing, namely, performs interrupt processing every 1⁄32 seconds. In the interrupt processing, the CPU 11 updates and sets the duty cycle while measuring (counting) the lighting time. The CPU 11 measures the lighting time, for example, by decrementing, by one, the remaining number of times that the interrupt processing is performed, each time the CPU 11 performs the interrupt processing. The light emitter driver 15 supplies a PWM control signal corresponding to the updated-and-set duty cycle to the light emitter L to cause the light emitter L to emit light with the luminous intensity corresponding to the duty cycle.

When the CPU 11 has measured the lighting time to the set time, the CPU 11 makes a setting to end the driving by the light emitter driver 15 (i.e., ends the dimming control) in the interrupt processing to cause the light emitter driver 15 to put out the light emitter L. The CPU 11 also makes a setting to request the normal processing to end the heavy load monitoring. Then, the CPU 11 makes a setting to prohibit the 32 Hz interrupt processing by itself, thereby ending the interrupt processing for the light emission control. In the normal processing, the heavy load monitoring function is stopped on the basis of the request to end the heavy load monitoring.

Normal processing that is loop processing does not progress while a process, a heavy-load process in particular, is being performed therein. If the process of updating the set value of the duty cycle is performed in normal processing, the process cannot be performed until it's turn comes, and accordingly the update timing is likely to be delayed. If such a delay repeatedly occurs, the lighting time becomes longer than the set time, and also the duty cycle is updated and set at intervals of a time longer than 1/32 seconds. As a result, natural change in the luminous intensity cannot be obtained, and even flickers may be seen.

Figure 3:
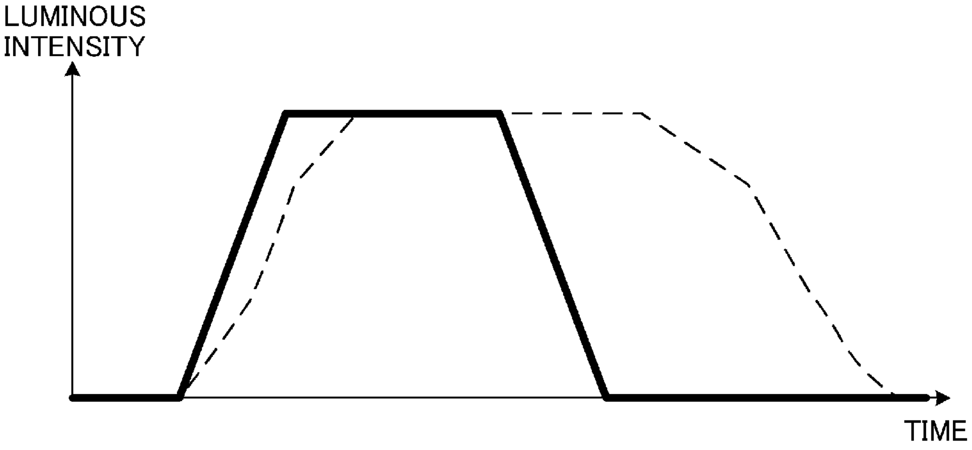
FIG. 3 shows an example of change in luminous intensity during dimming control.

FIG. 3 shows an example of change in the luminous intensity during dimming control.

The thick solid line represents an expected change pattern of the luminous intensity. The broken line represents a change pattern of the luminous intensity in a case where dimming control is performed in normal processing and the load of another process being performed in parallel is high. In the case indicated by the broken line, the update timing of the set value is delayed, and change in the luminous intensity is delayed accordingly. In addition to the change in the luminous intensity being delayed or uneven, the light emission time (lighting time) itself become longer than the one originally expected (set time).

Meanwhile, in this embodiment, the 32 Hz updating-and-setting of the duty cycle is performed by interrupt processing. This makes it possible to promptly update and set the duty cycle at each interrupt timing, regardless which or what process is being performed in normal processing. Hence, the electronic timepiece 1 hardly causes extension of the lighting time or a delay in updating and setting the duty cycle, and can obtain change in the luminous intensity as expected. Thus, the electronic timepiece 1 can perform more natural dimming control.

Figure 4:
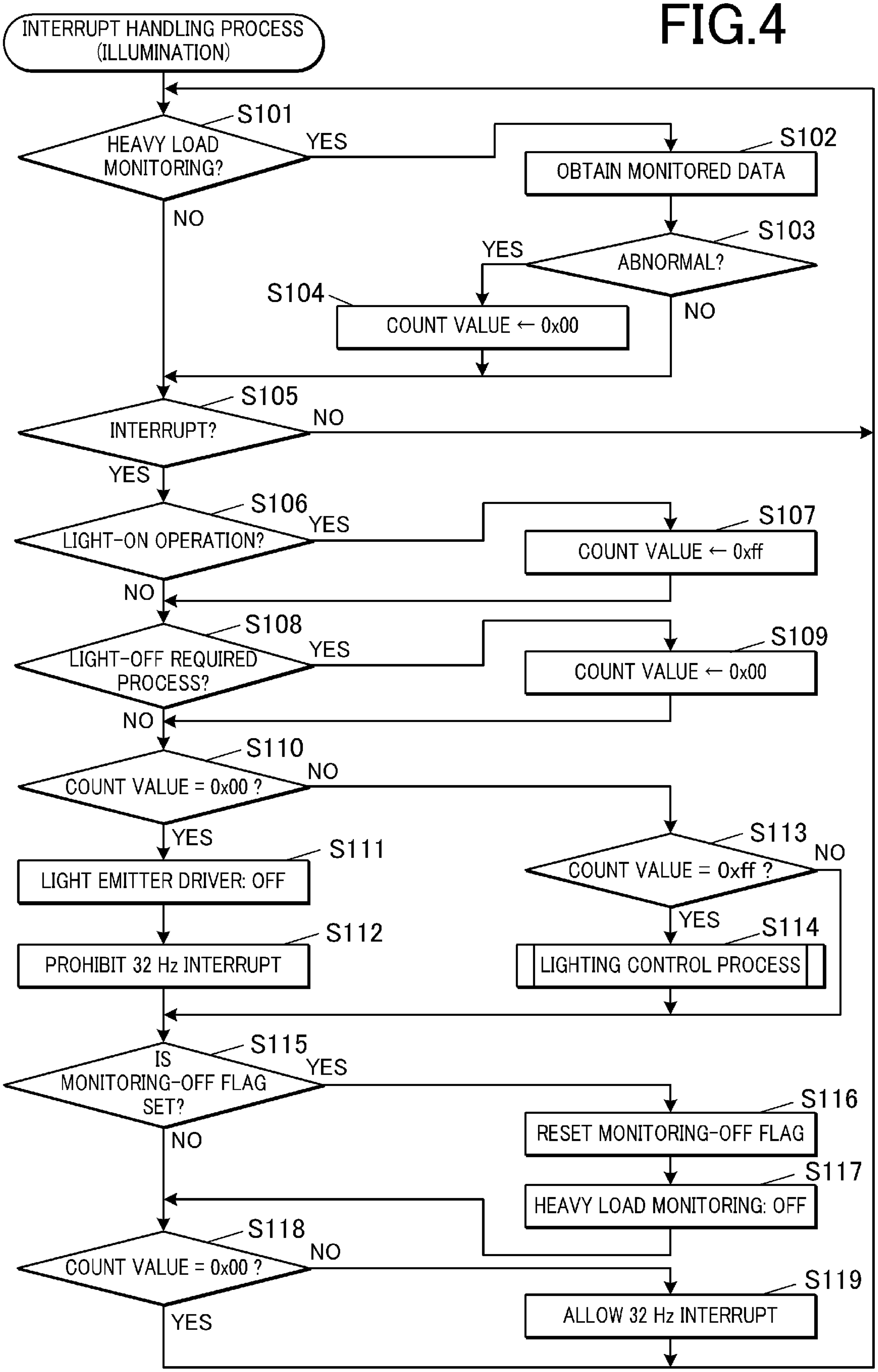
FIG. 4 is a flowchart shows a control procedure of a part of an interrupt handling process, the part being related to an illumination action.

FIG. 4 is a flowchart showing a control procedure of a part of an interrupt handling process that is performed by the electronic timepiece 1 of this embodiment, the part being related to the illumination action. This interrupt handling process is a process for properly performing interrupt processing. The interrupt handling process is called from the program 131 and started when the electronic timepiece 1 is started, and performed continuously as loop processing while the electronic timepiece 1 is in operation.

When the interrupt handling process is started, the CPU 11 determines whether the heavy load monitoring is being performed (Step S101). If the CPU 11 determines that the heavy load monitoring is being performed (Step S101; YES), the CPU 11 obtains the monitored data (detection result) from the battery detector 16 (Step S102). Examples of the monitored data include a value of the voltage input from the battery and a comparison result thereof with a threshold value. The CPU 11 determines whether the detection result is abnormal, for example, whether the input voltage is equal to or less than the threshold voltage (Step S103).

If the CPU 11 determines that the detection result is abnormal (Step S103; YES), the CPU 11 sets the count value, which represents the remaining lighting time (remaining number of times to be counted), to 0x00 (Step S104) and then proceeds to Step S105. If the CPU 11 determines that the detection result is not abnormal (Step S103; NO), the CPU 11 proceeds to Step S105.

If the CPU 11 determines in Step S101 that the heavy load monitoring is not being performed (Step S101; NO), the CPU 11 proceeds to Step S105.

In Step S105, the CPU 11 determines whether interrupt processing has been performed (Step S105). The CPU 11 determines whether interrupt processing has been performed since the last Step S105 by determining whether a flag is set, the flag being set in response to interrupt processing being performed. If the CPU 11 determines that interrupt processing has not been performed (Step S105; NO), the CPU 11 returns to Step S101. If there is a routine process(es) or the like that is not performed by interrupt processing, the CPU 11 may perform such a process(es) before returning to Step S101. Further, if there is no interrupt processing to be detected/performed promptly, the CPU 11 may put a predetermined processing halt time (HALT) between loops of the interrupt handling process (i.e., after each loop of the interrupt handling process).

If the CPU 11 determines that interrupt processing has been performed (Step S105; YES), the CPU 11 determines whether an operation on the pushbutton switch S4 for putting on the light emitter L (light-on operation) has been detected (Step S106). If the CPU 11 determines that no interrupt processing related to a light-on operation has been performed (Step S106; NO), the CPU 11 proceeds to Step S108. If the CPU 11 determines that interrupt processing related to a light-on operation has been performed (Step S106; YES), the CPU 11 sets the count value to 0xff (Step S107) and then the proceeds to Step S108.

In Step S108, the CPU 11 determines whether a light-off required process, which is not the illumination action, is being performed (Step S108). The light-off required process is a process that requires stopping lighting (i.e., stopping dimming control) even before the above set time elapses because, for example, execution of the process at the same time as the illumination action makes the load excessive. If the CPU 11 determines that such a light-off required process is being performed (due to its necessity) (Step S108; YES), the CPU 11 sets the count value to 0x00 (Step S109) and then proceeds to Step S110. If the CPU 11 determines that no light-off required process is being performed (Step S108; NO), the CPU 11 proceeds to Step S110. In the light-off required process, operation (action(s)) of the light emitter driver 15 may be stopped (OFF).

In Step S110, the CPU 11 determines whether the count value is 0x00 (Step S110). If the CPU 11 determines that the count value is 0x00 (Step S110; YES), the CPU 11 cuts (OFF) power supply to the light emitter driver 15 (Step S111). This puts out the light emitter L if it is lighting (i.e., has been put on). If the light emitter driver 15 has been already OFF in the light-off required process, and accordingly the light emitter L has been put out (OFF), the process in Step 110 is a confirmation process for safety. The CPU 11 makes a setting to prohibit 32 Hz interrupt processing (Step S112) and then proceeds to Step S115.

If the CPU 11 determines in Step S110 that the count value is not 0x00 (Step S110; NO), the CPU 11 determines whether the count value is 0xff (Step S113). If the CPU 11 determines that the count value is 0xff (Step S113; YES), the CPU 11 performs a lighting control process described below (Step S114) and then proceeds to Step S115. If the CPU 11 determines that the count value is not 0xff (Step S113; NO), the CPU 11 proceeds to Step S115.

In Step S115, the CPU 11 determines whether a monitoring-off flag that requests termination of the heavy load monitoring is set (Step S115). If the CPU 11 determines that the monitoring-off flag is set (Step S115; YES), the CPU 11 resets the monitoring-off flag (Step S116), ends the heavy load monitoring (Step S117) and then proceeds to Step S118.

If the CPU 11 determines that the monitoring-off flag is not set (Step S115; NO), the CPU 11 proceeds to Step S118.

In Step S118, the CPU 11 determines whether the count value is 0x00 (Step S118). If the CPU 11 determines that the count value is not 0x00 (Step S118; NO), the CPU 11 allows 32 Hz interrupt processing (Step S119) and then returns to Step S101. If the CPU 11 determines that the count value is 0x00 (Step S118; YES), the CPU 11 returns to Step S101.

Figure 5:
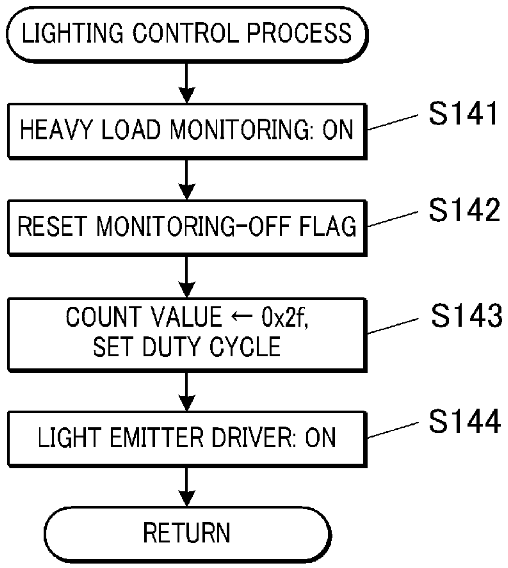
FIG. 5 is a flowchart showing a control procedure of a lighting control process.

FIG. 5 is a flowchart showing a control procedure of the lighting control process that is performed in the interrupt handling process.

When the lighting control process is started, the CPU 11 activates (ON) the heavy load monitoring (Step S141). The CPU 11 sets the abovementioned flag for the heavy load monitoring described to obtain, from the battery detector 16, the monitored data, which is the detection result of the voltage input to the CPU 11, at every cycle of the interrupt handling process.

The CPU 11 resets the monitoring-off flag (Step S142). This process is a setting action for not ending the heavy load monitoring by error.

The CPU 11 sets the count value to 0x2f, which corresponds to the lighting time of the light emitter L, and also sets the initial duty cycle (Step S143). The initial duty cycle is a small value since the luminous intensity gradually increases by the dimming control as described above.

The CPU 11 starts (ON) power supply to the light emitter driver 15 to cause the light emitter driver 15 to start the PWM dimming control (i.e., start lighting) of the light emitter L (Step S144). Then, the CPU 11 ends the lighting control process and returns to the interrupt handling process.

Figure 6:
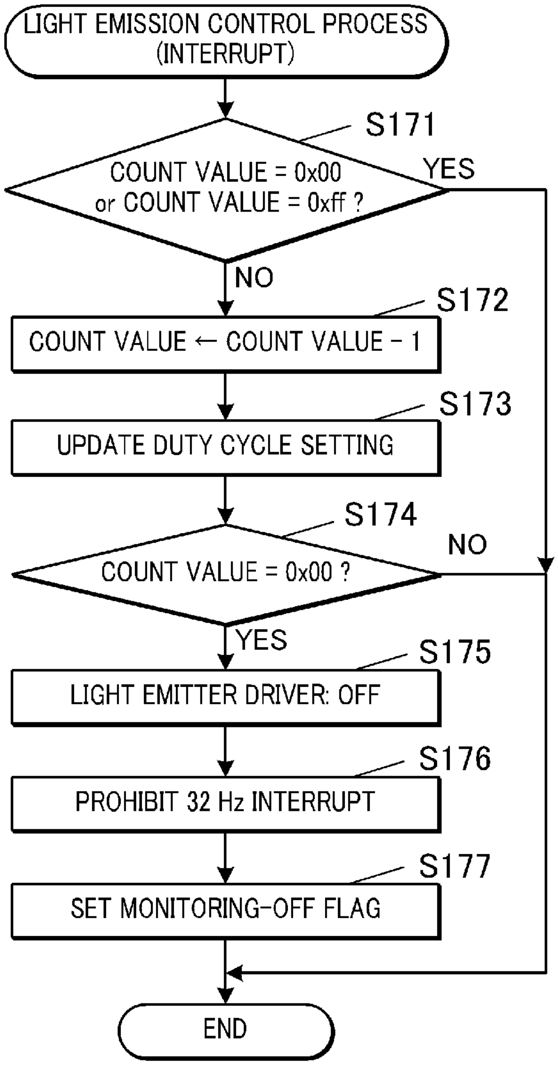
FIG. 6 is a flowchart showing a control procedure of a light emission control process that is performed by interrupt processing.

FIG. 6 is a flowchart showing a control procedure of a light emission control process that is performed by 32 Hz interrupt processing. This light emission control process is started and performed every 1/32 seconds while the 32 Hz interrupt processing is allowed.

The CPU 11 determines whether the count value is either 0x00 or 0xff (Step S171). The count value being 0x00 indicates that a light-off required process or the like has been performed as described above, whereas the count value being 0xff indicates that it is after detection of a light-on operation but before execution of the lighting control process. If the CPU 11 determines that the count value is either 0x00 or 0xff (S171; YES), the CPU 11 ends the light emission control process.

If the CPU 11 determines that the count value is neither 0x00 nor 0xff (Step S171; NO), the CPU 11 subtracts "1" from the count value (Step S172). The CPU 11 writes and updates (the setting of) the duty cycle corresponding to the count value in the register of the light emitter driver 15 (Step S173).

The CPU 11 determines whether the count value is 0x00 as a result of the process in Step S172 (Step S174). If the CPU 11 determines that the count value is 0x00 (Step S174; YES), the CPU 11 cuts (OFF) power supply to the light emitter driver 15 to stop light emission of the light emitter L (Step S175). The CPU 11 prohibits the 32 Hz interrupt processing (Step S176). The CPU 11 sets the monitoring-off flag (Step S177) and then ends the light emission control process.

If the CPU 11 determines in Step S174 that the count value is not 0x00 (Step S174; NO), the CPU 11 ends the light emission control process.

Thus, in the light emission control process, which is performed by interrupt processing, only low-load processes that finish in a short time, such as writing a value or the like in the register or the like. Examples of the value or the like include the count value, the set value of the duty cycle, and the monitoring-off flag. Hence, the light emission control process finishes promptly. In the electronic timepiece 1, all the processes that are each performed by interrupt processing, the processes including the second-cycle display update control and the detection of an input operation from the operation receiver 18 described above, are low-load processes. Accordingly, each interrupt processing is performed with almost no delay.

As described above, the light emission control device of the electronic timepiece 1 of this embodiment includes the CPU 11 that performs dimming control on the light emitter L (i.e., updates and sets the duty cycle) by 32 Hz interrupt processing. The CPU 11 performs the dimming control by interrupt processing (interrupt control), thus being able to reduce delays in setting the duty cycle even during execution of another process the processing load of which is high. Thus, the electronic timepiece 1 (light emission control device thereof) can suppress occurrence of the unnatural lighting state and allows the light emitter L to emit light more stably.

Further, the CPU 11 ends the dimming control in the interrupt processing. That is, the CPU 11 makes, in the interrupt processing, an end setting to end the dimming control to put out, fade out in particular, the light emitter L, thereby being able to perform the dimming control without a delay until the light emitter L is put out. Hence, the electronic timepiece 1 (light emission control device thereof) can more properly reduce occurrence of the unnatural lighting state.

Further, the CPU 11 starts the monitoring function of the heavy load state of the CPU 11 to start the dimming control, sets, in the interrupt processing at the end of the dimming control, an end request to end the monitoring function, and based on the end request, ends the monitoring function in normal action control other than the interrupt processing. In an electronic device with extremely limited power supply or operating power, such as the electronic timepiece 1, power supply may become insufficient if lighting of its light emitter, the power consumption (load) of which is relatively high among actions of the electronic device, is performed in parallel with another high-load process. The electronic timepiece 1 (light emission control device thereof) performs the function to monitor whether the electronic timepiece 1 is in the heavy load state during lighting of the light emitter L, thus being able to detect the heavy load state promptly and stop the dimming control if the electronic timepiece 1 is in the heavy load state. It is unnecessary to quickly end the monitoring function. Hence, the electronic timepiece 1 (light emission control device thereof) does not end the monitoring function in the interrupt processing, thus being able to lighten the interrupt processing.

Further, the CPU 11 may obtain a reception signal corresponding to a predetermined input operation on the operation receiver 18, and perform the dimming control for a set time (e.g., 1.5 sec.) in response to the predetermined input operation on the operation receiver 18. That is, the user can make, as needed, an input operation using the operation receiver 18 to put on the light emitter L in order to make the display surface or the like visible for a set time. If, in this case, the lighting state is unnatural, the user easily recognizes the unnaturalness. The electronic timepiece 1 (light emission control device thereof) can sufficiently suppress delays in the process(es) related to the dimming and accordingly naturally change the luminous intensity. Hence, the user can use the electronic timepiece 1 with comfort.

Further, the CPU 11 may determine, in normal action control other than the interrupt processing, whether a need to stop the dimming control before the set time elapses exists, and stop the dimming control in response to the existence of the need. Unlike the dimming control, a simple light-off action (i.e., not fade-out) does not need to be performed in interrupt processing because there is no substantial change in a situation even if it is somewhat delayed. The CPU 11 performs processes related to stopping the dimming control in normal processing (normal action control) in order.

Further, the electronic timepiece 1 of this embodiment includes the CPU 11 (with or without the light emitter driver 15) as the light emission control device and the light emitter L on which the CPU 11 performs the dimming control. In the electronic timepiece 1, the CPU 11, which has an extremely low power supply capability or processing capability as compared with a CPU of a general electronic device, performs the dimming control by interrupt processing as described above. Hence, the CPU 11 can update and set the duty cycle of PWM with almost no delay even if it happens to be performed with another high-load process in an overlapped manner. Therefore, the electronic timepiece 1 can stably perform dimming of the light emitter L without increase in the processing capability or the like of the CPU 11, and accordingly naturally change the luminous intensity.

Further, the light emission control method of this embodiment includes performing dimming control on the light emitter L by interrupt processing. By this dimming control, the light emission control method of this embodiment can suppress delays in the update-and-setting timing of the duty cycle even if the processing capability of a controller is limited, and accordingly easily perform natural dimming.

Further, the program 131 of this embodiment causes a computer to perform dimming control on the light emitter L by interrupt processing. Installation and execution of the program 131 into and by a computer makes it possible to easily perform appropriate dimming control without complicated adjustment of the control timing or increase in the processing capability of the computer.

The present disclosure is not limited to the above embodiment and can be modified in a variety of respects.

For example, in the above embodiment, interrupt processing for 32 Hz dimming control is performed, but not limited thereto. Any frequency can be set as far as it is suitable for persons to see change in the luminous intensity as natural luminance change.

Further, in the above embodiment, the CPU 11 performs the heavy load monitoring function while the light emitter L is emitting light. However, as far as basic actions as the electronic timepiece 1 (accurate measurement and display of time) are not disturbed, power supply may be managed by another method. Still further, an action(s) such as ON/OFF setting (flag setting) of the heavy load monitoring function may be performed in the interrupt processing.

Further, in the above embodiment, light emission of the light emitter L and the dimming control are performed in response to a press on the pushbutton switch S4 of the operation receiver 18, but not limited thereto. For example, in a case where a specific function is being performed in the electronic timepiece 1, light emission of the light emitter L and the dimming control may be performed in response to a condition being satisfied. Examples of the condition includes a condition that a physical sensor has detected a specific motion, tilt or the like of the electronic timepiece 1.

Further, the set time for light emission of the light emitter L and the change pattern of the luminous intensity in the dimming control are not limited to those described in the above embodiment. They can be changed to other appropriate time and pattern or changed in accordance with the surroundings' condition (e.g., the amount of light incident on the display surface) or the like.

Further, in the above embodiment, the dimming control on the light emitter L is performed in the electronic timepiece 1, but may be performed in another electronic device. Using interrupt processing for the dimming control in a situation where the processing load could be heavy for the processing capability of the CPU 11 in general can more stably produce luminance change that is natural change to the user's eyes.

Further, the light emitter L may have a light emitting device other than a standard LED, such as an organic LED (OLED), as far as its luminous intensity can be adjusted. Still further, the light emitter L is not limited to the one that illuminates the display surface of the electronic timepiece 1. The light emitter L may be the one that directly emits light in the shape of a mark (letter, figure, etc.) or the one that emits light through a transmission hole formed in the shape of a mark.

Further, in the above, the computer-readable storage medium storing the program 131 for the dimming control of the present disclosure is the storage 13 constituted by a nonvolatile memory, such as a ROM, and/or the like, but not limited thereto and may be another nonvolatile memory, such as a hard disk drive (HDD) or an MRAM, or a portable recording medium, such as a CD-ROM or a DVD. Further, as a medium to provide data of the program(s) of the present disclosure via a communication line, a carrier wave can be used.

The specific configuration/components and contents, procedures and so forth of the processes described in the above embodiment can be appropriately changed without departing from the scope of the present disclosure.

Although one or more embodiments of the present disclosure have been described above, the scope of the present disclosure is not limited to the embodiments described above but includes the scope stated in claims below and the scope of their equivalents.

The invention claimed is:

1. A light emission control device comprising:

at least one processor configured to perform dimming control on a light emitting device of a light emitter by interrupt processing, wherein the dimming control comprises:

starting a monitoring function of a heavy load state of the light emission control device to start the dimming control, setting, during the interrupt processing and at the end of the dimming control, an end request to end the monitoring function, and based on the end request, ending the monitoring function during normal action control other than the interrupt processing.

2. The light emission control device according to claim 1, wherein the dimming control further comprises:

obtaining a reception signal corresponding to a predetermined input operation on an input interface, and performing the dimming control for a set time in response to the predetermined input operation on the input interface.

3. The light emission control device according to claim 2, wherein the dimming control further comprises:

determining, during the normal action control, whether a need to stop the dimming control before the set time elapses exists, and stopping the dimming control in response to the existence of the need.

4. The light emission control device according to claim 1, wherein the light emitting device is a light emitting diode.

5. An electronic timepiece comprising:

the light emission control device according to claim 1; and the light emitting device on which the processor performs the dimming control.

6. The light emission control device according to claim 1, wherein the monitoring function of the heavy load state comprises monitoring a decrease in an input voltage of power that is supplied from a battery to the at least one processor.

7. The light emission control device according to claim 1, wherein the dimming control further comprises causing an increase or decrease in a luminous intensity of the light emitter multiple times such that a change in the luminous intensity of the light emitter becomes uniform.

8. A light emission control method performed by at least one processor, the light emission control method comprising:

performing dimming control on a light emitting device of a light emitter by interrupt processing, wherein the dimming control comprises:

starting a monitoring function of a heavy load state of a light emission control device that controls the light emitting device to start the dimming control, setting, during the interrupt processing and at the end of the dimming control, an end request to end the monitoring function, and based on the end request, ending the monitoring function during normal action control other than the interrupt processing.

9. The light emission control method according to claim 8, wherein the dimming control further comprises:

obtaining a reception signal corresponding to a predetermined input operation on an input interface, and in response to obtaining the reception signal, performing the dimming control for a set time.

10. The light emission control method according to claim 9, wherein the dimming control further comprises:

determining, during the normal action control, whether a need to stop the dimming control before the set time elapses exists; and stopping the dimming control in response to the existence of the need.

11. The light emission control method according to claim 8, wherein the light emitting device is a light emitting diode.

12. The light emission control method according to claim 8, wherein the monitoring function of the heavy load state comprises monitoring a decrease in an input voltage of power that is supplied from a battery to the at least one processor.

13. The light emission control method according to claim 8, wherein the dimming control further comprises causing an increase or decrease in a luminous intensity of the light emitter multiple times such that a change in the luminous intensity of the light emitter becomes uniform.

14. A non-transitory computer-readable storage medium storing a program that causes at least one processor to:

perform dimming control on a light emitting device of a light emitter by interrupt processing, wherein the dimming control comprises:

starting a monitoring function of a heavy load state of a light emission control device that controls the light emitting device to start the dimming control, setting, during the interrupt processing and at the end of the dimming control, an end request to end the monitoring function, and based on the end request, ending the monitoring function during normal action control other than the interrupt processing.

15. The non-transitory computer-readable storage medium according to claim 14, wherein the monitoring function of the heavy load state comprises monitoring a decrease in an input voltage of power that is supplied from a battery to the at least one processor.

16. The non-transitory computer-readable storage medium according to claim 14, wherein the dimming control further comprises causing an increase or decrease in a luminous intensity of the light emitter multiple times such that a change in the luminous intensity of the light emitter becomes uniform.

* * * * *